US00RE42820E

(19) United States
(12) Reissued Patent
Vallance

(10) Patent Number: US RE42,820 E
(45) Date of Reissued Patent: Oct. 11, 2011

(54) BANK DEPOSIT METHOD

(76) Inventor: Richard Vallance, Pickering (CA)

(21) Appl. No.: 12/588,217

(22) Filed: Oct. 7, 2009

Related U.S. Patent Documents

Reissue of:
(64) Patent No.: 7,472,826
Issued: Jan. 6, 2009
Appl. No.: 11/456,236
PCT Filed: Jul. 10, 2006

(51) Int. Cl.
*G06K 40/00* (2006.01)

(52) U.S. Cl. ..... 235/379; 235/375; 235/380; 705/45

(58) Field of Classification Search ..... 235/379, 235/375, 381, 380; 705/43, 45
See application file for complete search history.

(56) References Cited

U.S. PATENT DOCUMENTS

| | | | |
|---|---|---|---|
| 3,852,571 | A | 12/1974 | Hall et al. |
| 3,998,155 | A | 12/1976 | Cothran et al. |
| 4,314,352 | A | 2/1982 | Fought |
| 5,025,372 | A | 6/1991 | Burton et al. |
| 5,051,900 | A | 9/1991 | Ito et al. |
| 5,117,355 | A | 5/1992 | McCarthy |
| 5,252,811 | A | 10/1993 | Henochowicz et al. |
| 5,265,007 | A | 11/1993 | Barnhard, Jr. et al. |
| 5,326,960 | A | 7/1994 | Tannenbaum |
| 5,564,546 | A | 10/1996 | Molbak et al. |
| 5,583,759 | A | 12/1996 | Geer |
| 5,620,079 | A | 4/1997 | Molbak |
| 5,695,038 | A | 12/1997 | Keith, III et al. |
| 5,717,868 | A | 2/1998 | James |
| 5,774,663 | A | 6/1998 | Randle et al. |
| 5,787,403 | A | 7/1998 | Randle |
| 5,899,982 | A | 5/1999 | Randle |
| 5,910,988 | A | 6/1999 | Ballard |
| 5,930,788 | A | 7/1999 | Wical |
| 5,944,163 | A | 8/1999 | Keith, III et al. |

(Continued)

FOREIGN PATENT DOCUMENTS

| | | |
|---|---|---|
| CA | 2510812 | 12/2005 |

(Continued)

OTHER PUBLICATIONS

"Brink's Helps Retailers Turn Cash Receipts into Investable Funds Faster," Business Wire, Oct. 20, 2008, www.pr_inside.com/brinks-s-helps-retailers-turn-cash-receipts-870847.htm.

(Continued)

*Primary Examiner* — Edwyn Labaze
(74) *Attorney, Agent, or Firm* — Oliff & Berridge, PLC

(57) ABSTRACT

According to the present invention, a business is issued a deposit card readable on a debit card reader enabling the business to transmit deposit information to its bank or financial institution for crediting rather than debiting of its account. More particularly, a method is provided for facilitating bank deposits for a business having a debit card reader configured to send deposit information to a bank at which the business maintains at least one account. The method comprises the steps of:

(i) compiling deposit information concerning cash and negotiable instruments to be deposited in the account;
(ii) transmitting the deposit information to the bank via the debit card reader;
(iii) consolidating the cash and negotiable instruments into a deposit package;
(iv) labelling the deposit package to link it to the deposit information in step (ii); and,
(v) delivering the deposit package from step (iv) to the bank.

11 Claims, 1 Drawing Sheet

U.S. PATENT DOCUMENTS

| | | | |
|---|---|---|---|
| 5,950,179 | A | 9/1999 | Buchanan et al. |
| 5,963,647 | A | 10/1999 | Downing et al. |
| 5,974,146 | A | 10/1999 | Randle |
| 5,975,275 | A | 11/1999 | Keith, III et al. |
| 6,032,137 | A | 2/2000 | Ballard |
| 6,067,530 | A | 5/2000 | Brooks, Jr. et al. |
| 6,105,007 | A | 8/2000 | Norris |
| 6,105,009 | A | 8/2000 | Cuervo |
| 6,119,106 | A | 9/2000 | Mersky et al. |
| 6,182,052 | B1 | 1/2001 | Fulton et al. |
| 6,202,054 | B1 | 3/2001 | Lawlor et al. |
| 6,341,272 | B1 | 1/2002 | Randle |
| 6,405,182 | B1 | 6/2002 | Cuervo |
| 6,523,742 | B1 | 2/2003 | Awatsu et al. |
| 6,594,647 | B1 | 7/2003 | Randle |
| 6,626,357 | B1 | 9/2003 | Ross |
| 6,659,340 | B2 | 12/2003 | Siemens |
| 6,885,281 | B2 | 4/2005 | McGunn et al. |
| 6,896,177 | B2 | 5/2005 | Carter |
| 7,063,252 | B2 | 6/2006 | Smith et al. |
| 7,070,093 | B2 | 7/2006 | Siemens et al. |
| 7,111,754 | B1 | 9/2006 | Siemens |
| 7,113,929 | B1 | 9/2006 | Beach et al. |
| 7,143,933 | B2 | 12/2006 | Vematsu et al. |
| 7,216,098 | B1 | 5/2007 | Brooks, Jr. et al. |
| 7,610,215 | B1 | 10/2009 | Folk et al. |
| 7,635,085 | B2 | 12/2009 | Brown et al. |
| 2002/0011393 | A1 | 1/2002 | Siemens |
| 2002/0087468 | A1 | 7/2002 | Ganesan et al. |
| 2002/0091637 | A1 | 7/2002 | Bent et al. |
| 2002/0145035 | A1 | 10/2002 | Jones |
| 2003/0191722 | A1 | 10/2003 | Thompson et al. |
| 2003/0208438 | A1 | 11/2003 | Rothman |
| 2003/0208439 | A1 | 11/2003 | Rast |
| 2004/0148254 | A1 | 7/2004 | Hauser |
| 2004/0193537 | A1 | 9/2004 | Knapp |
| 2004/0210515 | A1 | 10/2004 | Hughes |
| 2004/0267673 | A1 | 12/2004 | Ballard |
| 2005/0096986 | A1 | 5/2005 | Taylor et al. |
| 2005/0228733 | A1 | 10/2005 | Bent et al. |
| 2006/0036537 | A1 | 2/2006 | Lawrence et al. |
| 2006/0106716 | A1 | 5/2006 | Hurwitz et al. |
| 2006/0253332 | A1 | 11/2006 | Dobbins |
| 2006/0253349 | A1 | 11/2006 | Brooks, Jr. et al. |
| 2007/0130063 | A1 | 6/2007 | Jindia et al. |
| 2007/0194102 | A1 * | 8/2007 | Cohen et al. ..... 235/379 |
| 2008/0120232 | A1 | 5/2008 | Herrin et al. |
| 2009/0006249 | A1 | 1/2009 | Morgan et al. |
| 2009/0018959 | A1 | 1/2009 | Doran et al. |

FOREIGN PATENT DOCUMENTS

| | | |
|---|---|---|
| EP | 0455200 A2 | 11/1991 |
| EP | 1445744 | 8/2004 |
| GB | 807880 | 1/1959 |
| GB | 2079846 | 1/1982 |
| GB | 2130299 | 5/1984 |
| GB | 2326671 | 12/1998 |
| JP | A 58-195272 | 11/1983 |
| WO | WO 01/11528 | 2/2001 |
| WO | WO 02/093457 | 11/2002 |

OTHER PUBLICATIONS

International Search Report (PCT/CA2007/000400) dated Jun. 20, 2007.

* cited by examiner

BANK DEPOSIT METHOD

Matter enclosed in heavy brackets [ ] appears in the original patent but forms no part of this reissue specification; matter printed in italics indicates the additions made by reissue.

FIELD OF THE INVENTION

This invention relates to processing of banking information. More particularly, this invention relates to the practice of businesses, particularly retailers in depositing daily receipts into a night deposit box maintained by a bank or analogous institution.

BACKGROUND OF THE INVENTION

A typical retailer will deposit the daily receipts into a night deposit box maintained by a bank or other financial institution. The current practice involves counting daily cash, cheque and credit card receipts; recording the receipts on an approved deposit document; placing the cash, cheques and credit card receipts into a night deposit bag along with the deposit document; and, depositing the night deposit bag at the bank.

A problem with the present procedure arises from the time delay between the deposit document being filled out and the bank confirming and posting the deposit amounts in their reserves against a bank customer's account.

Until the bank reviews and checks the deposit document, the bank has no idea what amount the customer is depositing. Furthermore it may take days to confirm the amounts whether by contract staff or in-house staff. Still furthermore, the staff verifying the amounts may be faced with problems arising from the handwritten deposit documents which may require extra time to process illegible, forgotten or non-existent entries. From the standpoint of the bank, the bank cannot post the deposit amount to its reserves until the verification process is complete. Similarly the bank's customer has no access to the amount deposited until the bank finishes its processing.

SUMMARY OF THE INVENTION

The present invention recognizes that the majority of a bank's retail clients utilize a debit card system whereby a debit cardholder may direct transfer of funds from a debit cardholder's account to the retailer.

According to the present invention, a business is issued a deposit card readable on a debit card reader enabling the business to transmit deposit information to its bank or financial institution for crediting rather than debiting of its account. More particularly, a method is provided for facilitating bank deposits for a business having a debit card reader configured to send deposit information to a bank at which the business maintains at least one account. The method comprises the steps of:

(i) compiling deposit information concerning cash and negotiable instruments to be deposited in the account;
(ii) transmitting the deposit information to the bank via the debit card reader;
(iii) consolidating the cash and negotiable instruments into a deposit package;
(iv) labelling the deposit package to link it to the deposit information in step (ii); and,
(v) delivering the deposit package from step (iv) to the bank.

According to one embodiment of the present invention, the deposit information may be sent utilizing an access card issued by the bank to the business.

The identity of the depositor may be identified utilizing a private identification number ("PIN number").

DESCRIPTION OF THE DRAWING

Preferred embodiments of the present invention are described below with reference to the accompanying illustration in which.

DESCRIPTION OF THE PREFERRED EMBODIMENTS

Figure 1:
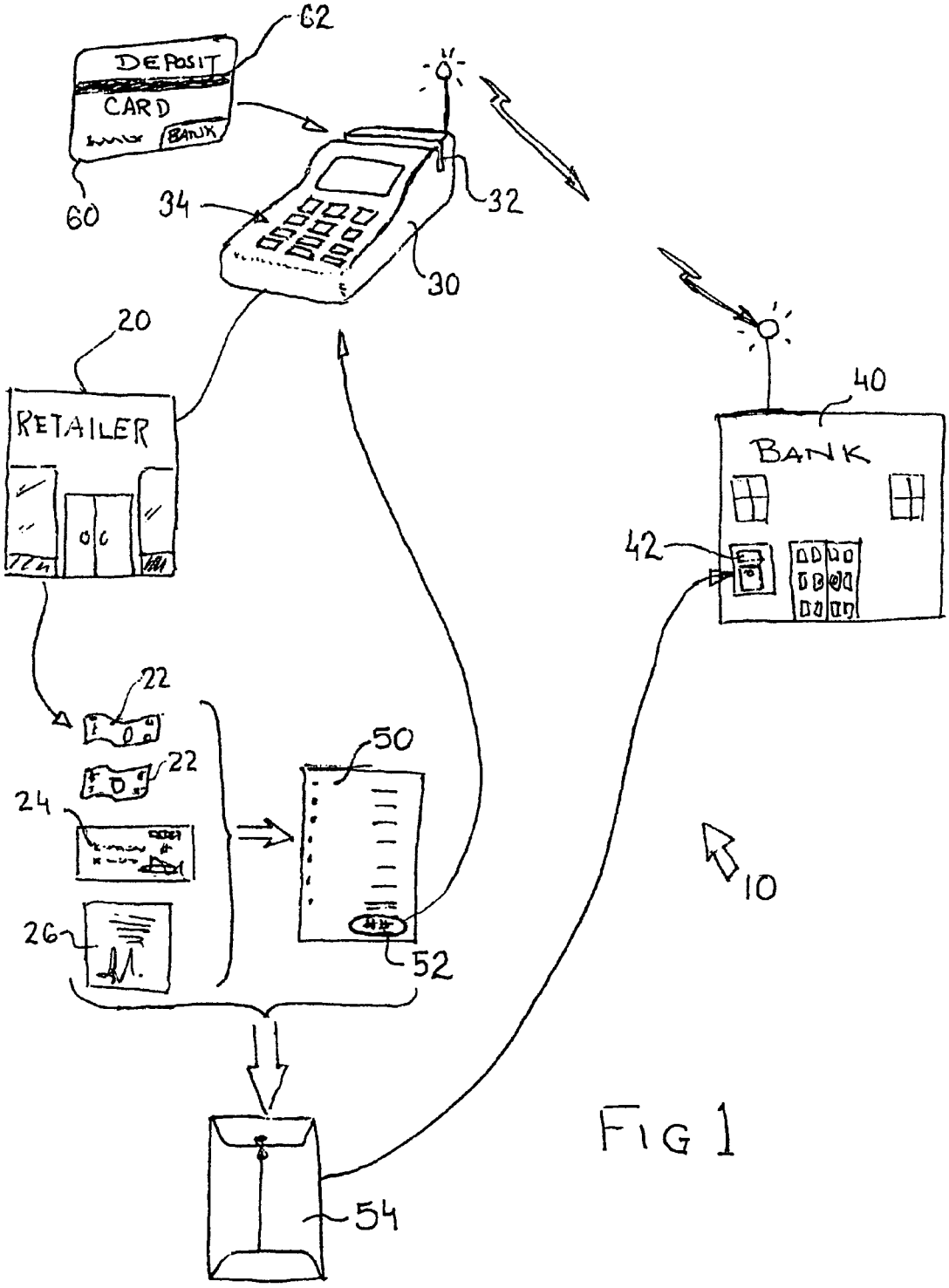
FIG. 1 is a schematic representation of a method according to the present invention.

A method of submitting bank deposits for a business according to the present invention is generally set out in the schematic illustration generally designated by reference numeral 10 in FIG. 1.

A retailer 20 during the course of a typical day will amass various negotiable instruments including cash 22, cheques 24 and credit card slips 26. The retailer has a debit card reader 30 which would ordinarily be used to transmit debit information to a bank or other financial institution 40 to enable a customer to pay for a purchase by directly transferring funds from the purchaser's account to an account maintained by the retailer 20 at the bank 40.

The retailer would conventionally consolidate deposit information which may consist of any one or more of cash 22, negotiable instruments 24 and credit deposit slips 26 and prepare a bank deposit form 50. The bank deposit form 50 would typically list the nature of each item to be deposited at the bank and would contain a total 52 setting out the sum of the funds being deposited.

Conventionally, the cash and negotiable instruments would be placed into a deposit package 54 which would be deposited in a night deposit box 42 at a convenient branch of the retailer's bank 40.

Some time after the deposit is made, a clerk at the bank 40 would open the deposit envelope 54, reconcile the cash and negotiable instruments contained in the deposit envelope 54 with the deposit statement 50. Assuming the amounts reconcile, the bank would credit the account of the retailer 20 by an amount corresponding to the amount 52. If however there are any inconsistencies, steps would have to be taken to reconcile the amounts prior to any crediting of the account of the retailer 20.

According to the present invention, the retailer is provided with a deposit card 60 readable on the debit card reader 30. The deposit card may be configured similar to a debit card and contain an information strip such as magnetic stripe 62 which may be read by swiping the card 62 through a reader such as the slot 32 in the debit card reader 30. The retailer may also be provided with a security code such as a private identification number ("PIN number") for verification purposes. Swiping the card and entering the PIN number enables the retailer 20 to cause the debit card reader 30 to communicate with the bank 40.

According to the present invention, the retailer would enter the total amount 52 representing the sum of the cash negotiable instruments 22, 24 and 26 being deposited on the debit card reader 30 to transmit the sum to the bank 40 for immediate deposit in the account of the retailer 20 at the bank 40.

Information entry means such as a keypad 34 may be provided for entering the information to be transmitted to the bank 40.

Once the deposit information has been sent to the bank 40, the deposit envelope 54 would be delivered and deposited in the night deposit box 42.

An advantage of the present invention is that it transmits deposit information to the bank other than by a deposit slip attached to the consolidated deposit information in the deposit envelope 54.

The expression "retailer" herein refers to any entity that provides wares and/or services to a customer in exchange for money and should be interpreted broadly rather than being restricted to merchants. Furthermore, the expression "bank" includes any financial institution that can maintain a deposit account on behalf of the retailer and would include, without limitation, trust companies, credit unions and other institutions as well as chartered banks.

Communication between the debit card reader 30 and the bank 40 may be by any suitable means and would include, without restriction, telephone modems, internet, cable and wireless means.

Although it is expected that in most cases it will be more convenient for the retailer to use the debit card reader on their premises for transmitting the deposit information, it would be possible to modify the debit card reader of a bank in accordance with the above. In other words, the above capabilities could be installed on a banking machine rather than on a merchant's debit card reader. The principle in effect would remain the same, namely that deposit information is transmitted directly at or before the time of deposit rather than being entered after the material deposited is reviewed.

A concern which may arise in using a system in accordance with the above is the possibility of fraudulent transactions. In other words, deposit information may be entered without an actual deposit being made. This presents a risk associated with the system and as with other risks, it may be possible to insure against such risks. For example, a third party might provide the debit information transmission services and provide a bond or other assurance to the bank or other financial institution that any deposits entered will be guaranteed. In other words, the risk of loss will be shifted from the bank to an insurer or other third party.

The above description is intended in an illustrative rather than a restrictive sense Variations may be apparent to persons skilled in such methods without departing from the invention as defined by the claims set out below.

The invention claimed is:

1. A method of facilitating bank deposits for a business [having a debit card reader configured to send deposit information to] *with* a bank at which said business maintains at least one account, said method comprising [the steps of]:

(i) compiling deposit information concerning *a total amount of* cash and negotiable instruments to be deposited in said account;

(ii) transmitting said deposit information to said bank [via said debit card reader];

(iii) consolidating said cash and negotiable instruments *used to compile said deposit information* into a deposit package;

(iv) [labelling] *labeling* said deposit package to link it to said deposit information in step (ii); *and*

(v) [delivering] *arranging delivery of* said deposit package from step (iv) to said bank, wherein said [bank makes] *business receives* funds corresponding to the value of said *amount of* cash and negotiable instruments [available to said business] *from said bank* after step (ii) and before step (v).

2. The method of claim 1 wherein:

said deposit information is transmitted as a total amount via a deposit card readable by [said] *a* debit card reader.

3. The method of claim 2 wherein:

said [labelling] *labeling* in step (iv) is effected by placing a deposit slip with said deposit information in said deposit package along with said cash and negotiable instruments.

4. A method according to claim 3 [including the further step of providing] *further comprising obtaining* third party assurance to said bank that said deposit information will be honoured regardless of the accuracy of [the] said deposit information.

5. The method of claim 2 wherein:

said debit card reader is at a location other than premises of said business.

6. The method of claim 1, wherein *the transmitting is achieved via a debit card reader, and* said debit card reader is at a premises of said business remote from said bank.

7. A method of [facilitating bank deposits for a retailer having a debit card reader on a premises of said retailer that is configured to send deposit information to a bank at which said retailer maintains at least one account, said method comprising the steps of] *accessing funds by a business having an account with a bank, the method comprising*:

(i) compiling deposit information concerning [said retailer's daily] *a total amount of* cash and negotiable instruments to be deposited in said account;

(ii) [using a deposit card with said debit card reader to transmit] *transmitting* said deposit information to said bank;

(iii) consolidating said [retailer's daily] cash and negotiable instruments *used to compile said deposit information* into a deposit package;

(iv) [providing] *labeling* said deposit package [with a label] to link it to said deposit information in step (ii);

*(v) receiving access to funds from said bank corresponding to the value of said amount of cash and negotiable instruments; and*

[(v) delivering] *(vi) arranging delivery of* said deposit package of step (iv) [from said retailer's premises] to said bank;

[(vi) reconciling on behalf of said bank said cash and said negotiable instruments in said package with said deposit information; and]

(vii) wherein [said bank credits said account by an amount corresponding to said deposit information after the deposit infirmation transmittal step (ii) and prior to the reconciling step (vi)] *step (v) occurs before step (vi)*.

8. A method according to claim 7 [including the further step of providing] *further comprising obtaining* third party assurance to said bank that said deposit information will be honoured regardless of the accuracy of [the] said deposit information.

9. The method of claim 7, wherein *the transmitting is achieved via a debit card reader, and* said debit card reader is at a premises of said retailer remote from said bank.

*10. The method according to claim 1, wherein said deposit information is transmitted electronically.*

*11. The method of claim 1 wherein: said deposit information is transmitted to the bank via a third party.*

* * * * *

UNITED STATES PATENT AND TRADEMARK OFFICE

CERTIFICATE OF CORRECTION

PATENT NO. : RE42,820 E
APPLICATION NO. : 12/588217
DATED : October 11, 2011
INVENTOR(S) : Vallance It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*